United States Patent

Monahan et al.

(10) Patent No.: US 12,368,667 B2
(45) Date of Patent: Jul. 22, 2025

(54) VEHICLE DATA

(71) Applicant: CUBIC TELECOM LIMITED, Dublin (IE)

(72) Inventors: Frank Monahan, Dublin (IE); Damian Power, Dublin (IE); Marc Concannon, Dublin (IE); Barry Napier, Wicklow (IE)

(73) Assignee: CUBIC TELECOM LIMITED, Dublin (IE)

( * ) Notice: Subject to any disclaimer, the term of this patent is extended or adjusted under 35 U.S.C. 154(b) by 18 days.

(21) Appl. No.: 18/292,134

(22) PCT Filed: Jul. 26, 2022

(86) PCT No.: PCT/EP2022/070894
§ 371 (c)(1),
(2) Date: Jan. 25, 2024

(87) PCT Pub. No.: WO2023/006716
PCT Pub. Date: Feb. 2, 2023

(65) Prior Publication Data
US 2024/0356837 A1    Oct. 24, 2024

(30) Foreign Application Priority Data

Jul. 27, 2021 (GB) ..................... 2110791

(51) Int. Cl.
*H04L 45/302*    (2022.01)
*H04L 12/66*    (2006.01)
*H04L 61/4511*    (2022.01)
*H04L 67/12*    (2022.01)
*H04W 4/44*    (2018.01)

(52) U.S. Cl.
CPC ............ *H04L 45/304* (2013.01); *H04L 12/66* (2013.01); *H04L 61/4511* (2022.05); *H04L 67/12* (2013.01); *H04W 4/44* (2018.02)

(58) Field of Classification Search
CPC . H04L 12/4633; H04L 45/74; H04L 47/2475; H04L 45/304; H04L 61/4511; H04L 12/66
See application file for complete search history.

(56) References Cited

U.S. PATENT DOCUMENTS 7,610,330 B1 * 10/2009 Quinn ..................... H04L 45/02
709/201
10,454,823 B1 * 10/2019 Thomas .................. H04L 45/74
2003/0016636 A1 * 1/2003 Tari ..................... H04L 61/4511
370/473

(Continued)

FOREIGN PATENT DOCUMENTS

CN        106953788        12/2019

OTHER PUBLICATIONS

International Search Report and Written Opinion issued in International Application No. PCT/EP2022/070894, dated Feb. 2, 2023(13 pages).

(Continued)

*Primary Examiner* — Tonia L Dollinger
*Assistant Examiner* — Linh T. Nguyen
(74) *Attorney, Agent, or Firm* — Finnegan, Henderson, Farabow, Garrett & Dunner LLP

(57) ABSTRACT

A method of classifying in-vehicle data traffic is provided.

20 Claims, 9 Drawing Sheets

(56) References Cited

U.S. PATENT DOCUMENTS

| | | | |
|---|---|---|---|
| 2004/0030766 A1* | 2/2004 | Witkowski | H04L 49/254 |
| | | | 709/223 |
| 2014/0250166 A1* | 9/2014 | Desai | G06Q 30/0601 |
| | | | 709/203 |
| 2017/0251339 A1 | 8/2017 | Addepalli et al. | |
| 2021/0014328 A1 | 1/2021 | Singhal et al. | |
| 2021/0067408 A1 | 3/2021 | Vaidya et al. | |
| 2023/0345347 A1* | 10/2023 | Wang | H04W 40/246 |
| 2023/0379293 A1* | 11/2023 | Muñoz De La Torre Alonso | H04L 61/2557 |
| 2024/0089317 A1* | 3/2024 | Ding | H04L 67/104 |

OTHER PUBLICATIONS

Nguyen Kien et al, "Empowering 5G Mobile Devices with Network Softwarization", IEEE Transactions on Network and Service Management, IEEE, USA, vol. 18. No. 3, Jul. 6, 2021, p. 2492-2501.

* cited by examiner

VEHICLE DATA

This application is a National Stage filing under 35 U.S.C. § 371 of International Application No. PCT/EP2022/070894, filed on Jul. 26, 2022, which claims the benefit of foreign priority of GB2110791.7, filed Jul. 27, 2021, the entire contents of which are incorporated herein by reference.

FIELD

The present application relates to a method and system for analysing network traffic. In particular the present application relates to a method and system that provides analysis of data traffic between a vehicle and data service providers.

BACKGROUND

In-vehicle internet traffic usage is increasing year on year. The provision of video and audio streaming services, navigation systems, user generated content sharing, and the like is becoming ubiquitous. Many new vehicles are delivered with internet connectivity. Other ways of enabling this include the use of third-party Wi-Fi devices that can be retrofitted into a vehicle's on-board diagnostics (OBD) system. Irrespective of the manner of how the connectivity is provided, once provided this is typically provided over a cellular network which routes the data traffic appropriately between the vehicle and the appropriate data service provider associated with the requested traffic. Examples of these service providers include Netflix, Spotify, Google, and the like.

FIG. 1 shows a simplified architecture for a conventional provision of in-vehicle network data. The vehicle 105 is configured to communicate over a cellular network 110 with a cellular service provider 115. The cellular network will include conventional network components such as a Packet Data Network Gateway, PGW, which provides connectivity from the vehicle 104 to external packet data networks (PDNs) by being its point of exit and entry of traffic. The cellular service provider 115 is associated with the vehicle 105. Authorised vehicles that can access network services through the cellular service provider 115 are typically identified using their International Mobile Subscriber Identifier (IMSI), or other mobile device identifiers that are specific to that vehicle. Having received a request for access to network services, the service provider 115 routes the traffic to an appropriate network service provider, shown in the schematic of FIG. 1 as being a cloud based service provider 120. The architecture of FIG. 1, whilst showing a vehicle 105 as the end point data consuming device, operates very much in the same manner as mobile device networks.

In effect, what happens at the service provider 115 is that traffic from an authorised vehicle is routed through to an appropriate destination associated with the traffic request. For example, if the request is for a music streaming service, the request is routed through to an internet based music streaming service. If the request is for video streaming, the request is routed to an internet based video streaming service. In both instances, the service provider 115 simply routes the traffic between these services and the vehicle. In conventional arrangements, the service provider 115 simply classifies these request as data services generically and does not have the capacity to distinguish between different types of data services.

There are challenges associated with classifying the vehicle data traffic on a granular service level, and also with providing any level of granularity on the volume of traffic being used per service. The lack of any granular analysis on in-vehicle traffic reduces the capacity to identify in any level of detail network usage and reduces the abilities to identity anomalies, including security and operational issues.

There are also issues whereby a vehicle manufacturer may pre-associate their vehicle access with a dedicated service provider 115 but need to be able to manage what data services are consumed within a vehicle.

There is also a need to be able to identify specific network traffic as being associated with specific network data service providers, so as to facilitate the routing of that traffic through dedicated channels.

For these reasons there is a need to provide increased granularity as to actual data services being utilised within a network.

SUMMARY

Accordingly, a first embodiment of the application provides a method as defined in claim 1. Advantageous embodiments are provided in the dependent claims. A network node configured to provide the method is also provided.

According to an aspect of the invention there is provided a method at a network node of classifying in-vehicle data traffic, the method comprising:

Defining at the network node a first network namespace and a second network namespace, the first network namespace comprising an ingress network interface configured to receive incoming request data packets and deliver response data packets, the second network namespace comprising an egress network interface configured to receive incoming response data packets and deliver request data packets, wherein channels are provided between the first network namespace and the second network namespace such that traffic between the ingress network interface and the egress network interface is routed through the channels;

Receiving, from a vehicle, a plurality of incoming request data packets at the network node, the data packets originating from an application executing at the vehicle;

For each data packet of the plurality of incoming request data packets:

Extracting from a header of the data packet a source IP address for the data packet, the source IP address being associated with the vehicle;

Extracting from the header of the data packet, a destination IP address for the data packet, the destination IP address being associated with a service requested by the application;

Determining a volume of data for the incoming data packet by inspecting the header of the data packet;

Checking the destination IP address against a routing table, and;

On determining that the destination IP address is defined within the routing table, routing the incoming data packet through a channel defined for that destination IP address, or On determining that the destination IP address is not defined within the routing table, routing the incoming data packet through a default channel provided for all not-defined destination IP addresses;

Updating a channel volume indicator based on the determined volume of data for the incoming request data packet;

Transmitting the plurality of incoming request data packets from the network node onward to the destination IP addresses associated with each of the request data packets.

Preferably the incoming request data packets are received at least partially over a cellular data network.

Preferably the routing table uses the same channel for identical destination IP address traffic.

Preferably the method comprises:
In response to transmitting the plurality of incoming request data packets from the network node onward to the destination IP addresses receiving a plurality of incoming response data packets at the network node,
For each data packet of the plurality of incoming response data packets:
Extracting from a header of the data packet a destination IP address for the data packet, the destination IP address being associated with the vehicle;
Extracting from the header of the data packet, a source IP address for the data packet, the source IP address being associated with a service requested by the application;
Determining a volume of data for the incoming data packet by inspecting the header of the data packet;
Checking the source IP address against the routing table, and;
On determining that the source IP address is defined within the routing table, routing the incoming data packet through a channel defined for that source IP address, or
On determining that the source IP address is not defined within the routing table, routing the incoming data packet through a default channel provided for all not-defined source IP addresses;
Updating a channel volume indicator based on the determined volume of data for the incoming request data packet;
Transmitting each of the plurality of incoming response data packets from the network node onward to the respective vehicle associated with the destination IP address for each of the response data packets. It will be appreciated that the destination IP address can be associated as, or serve as a proxy, for a mobile device identifier for each of the response data packets.

Preferably the transmitting is done at least partially using a cellular data network.

Preferably the routing table uses the same channel for identical source IP address traffic.

Preferably each of a plurality of the channels are associated with distinct applications executing at the vehicle.

Preferably the method comprises defining the channels within the routing table, the method comprising associating known IP address values with specific channels, such that traffic destined for an IP address which is associated with a specific channel is routed through that channel.

Preferably the method comprises dynamically updating the routing table, the method comprising for an incoming DNS request data packet performing a packet inspection by first matching the domain in the DNS query against a collection of defined expressions, each defined expression being associated with a specific service and if a match is found, the method comprises on receiving a response data packet to the request data packet, updating the routing table with the IP address or addresses for the domain such that subsequent traffic to and from those IP addresses will route through the channel associated with the specific service which originally matched against the DNS request data packet.

Preferably the method comprises dynamically updating the routing table, the method comprising:
monitoring upstream TLS packets to identify a TLS handshake,
on determining a TLS handshake is in process inspecting the packet to determine whether it contains an SNI header,
on locating an SNI header, extracting a value of the header and comparing that value against SNI matching rules defined for each service,
if an SNI rule matches, updating the routing table for the service owning the rule with the destination IP Address header of the TLS packet.

According to a further aspect of the invention there is provided a network node comprising a processor, a first network interface, and a second network interface, Preferably the network node is configured to carry out the method.

BRIEF DESCRIPTION OF THE DRAWINGS

The present application will now be described with reference to the accompanying drawings in which.

DETAILED DESCRIPTION OF THE DRAWINGS

Figure 1:
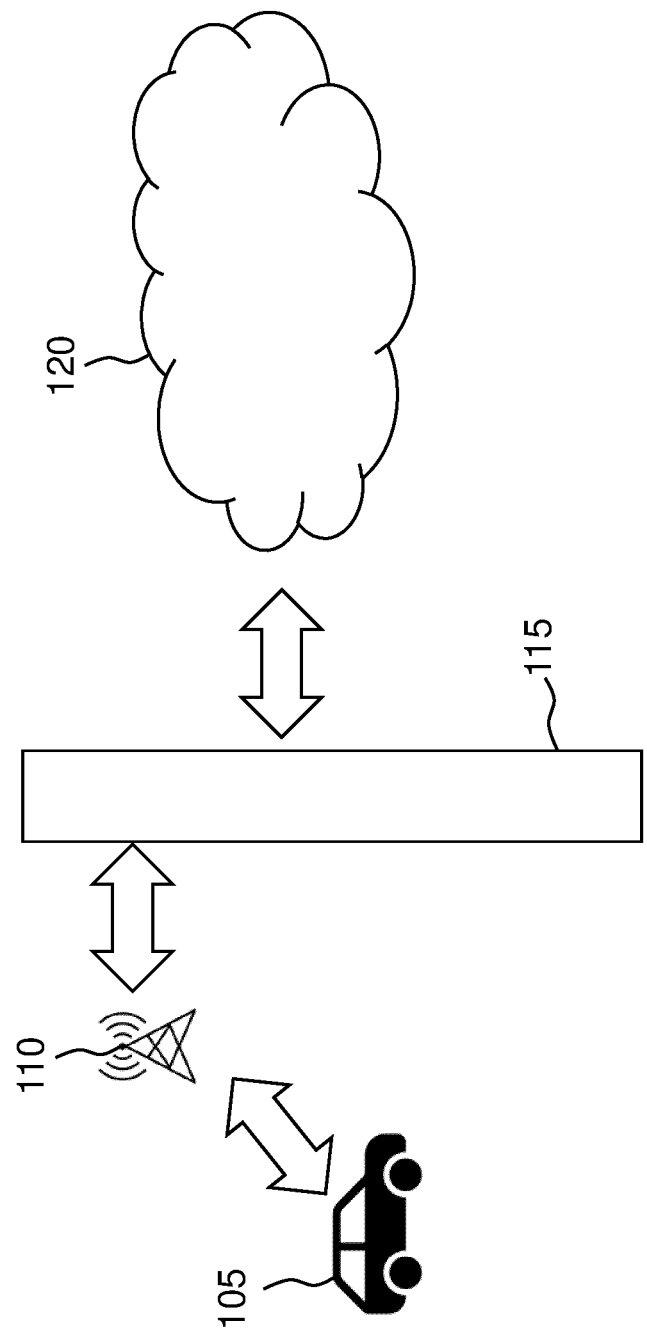
FIG. 1 is a schematic showing a network architecture of a system in accordance with the prior art.
Figure 2:
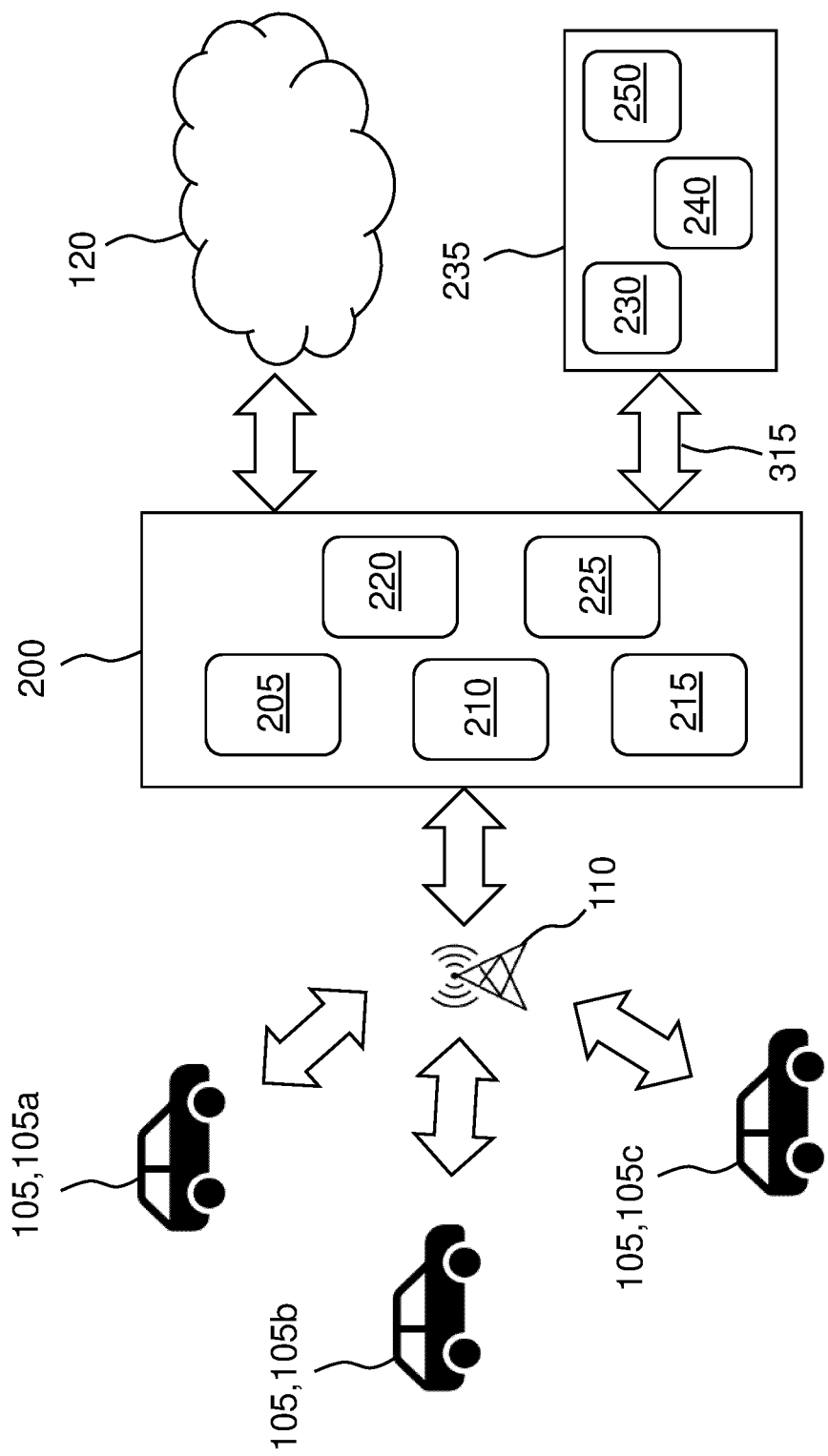
FIG. 2 is a schematic showing a network architecture of a system in accordance with the present invention.

FIG. 2 is a network architecture integrating a processing or classification system 200 per the present invention. The processing or classification system 200 is configured to classify network traffic flowing through it into destination services and to report on the volume of traffic per service. The system 200 is configured to identify the ultimate destination of any traffic received from a vehicle 105, and to use that identified destination as a classifier of the data service being consumed at that vehicle 105.

Incoming traffic from a vehicle 105, which is received in the form of data packets, is parsed to identify the destination IP address for that traffic. Having determined the destination IP address, the system 200 is then configured to determine whether that IP address is already pre-associated with a known data service provider. On determining that there is a known data service provider, the system then channels that incoming traffic through a channel within the system that is dedicated to traffic for that data service provider. Traffic destined for data service provider A is routed through channel A, traffic destined for data service provider B is routed through channel B, etc. By channeling the traffic through dedicated channels based on the destination IP Address, the traffic can be analysed and classified based on header information as opposed to requiring any investigation of the actual payload of a packet. This facilitates a real-time minimal delay classification of the traffic.

It will be understood that the classification system per the present invention ensures that the volume of data passing through any one channel is therefore reflective of the actual usage of specific data services and can be monitored, reported on, or otherwise controlled.

The system functionality can be visualised with five core blocks 205-225, although it will be appreciated that this is for an ease of understanding and the functionality that is discussed below with reference to one block could equally be provided by another block. In terms of functionality, but not constraining to any one specific implementation, it can be understood that the system comprises the following:

Configuration Manager 205

The Configuration Manager 205 validates configuration options and publishes configuration updates to the other components of the system 200.

DNS Monitor 210

The DNS Monitor 210 scans DNS traffic traversing through the system, comparing queries and responses to a service rules as defined within the configuration manager data structures, and publishes updates to a Routing Controller 220 when a match is found.

SNI Monitor 215

The SNI Monitor 215 scans TLS handshakes, and applies service matching rules to SNI headers. When a match is found, an update is published to the Routing Controller 220.

Routing Controller 220

The Routing Controller configures a routing table to allow for implicit classification of the traffic passing through the system 200. The initial routing table configuration is based upon IP address and network ranges that are included in the configuration of each service. However, the Routing Controller is also capable of dynamically modifying the routing tables at runtime, in response to updates received from the DNS and SNI Monitors.

EDR Generator 225

The EDR generator 225 monitors the headers of packets flowing through each channel in the system and publishes regular updates summarising the traffic per service per vehicle.

The component functional blocks 205-225 of the classification system 200 can be configured and monitored using an administration system 230. FIG. 2 shows this administration system provided on a separate device, a management network 235, but it will be appreciated that this is for schematic purpose as it separates visually the administration and post-processing functionality from the functional components that actively interface with traffic passing through classification system 200. The management network 235 may also host a database 240 where the EDR data published by the EDR generator 225 can be stored, and a data analytics engine 250. In optional embodiments the database 240 and/or analytics engine 250 may be provided on one or more further devices separate from the administration system 230. Some of the details of the system of FIG. 2 are further discussed with reference to FIG. 3.

Whilst it is not intended to constrain the present teaching to any one specific network operating system or the like, for the present purpose it will be assumed that the classification system 200 is hosted on a LINUX machine (which can be a physical or virtual machine) with three network cards:

A Control NIC 315 provides communication between the system 200 and the management network 235. The control NIC 315 can be used to receive and transmit communications from the administration system 230 that is used to administer the system 200. The Control NIC 315 can also be used to provide the data transmission from the EDR generator 225 to the database 240 and to the analytics engine 250;

An Ingress NIC 305 is connected to an Ingress network for communicating with the vehicle; and An Egress NIC 310 is connected to an Egress network for communicating with external network elements such as the services which are requested by the vehicle.

Figure 3:
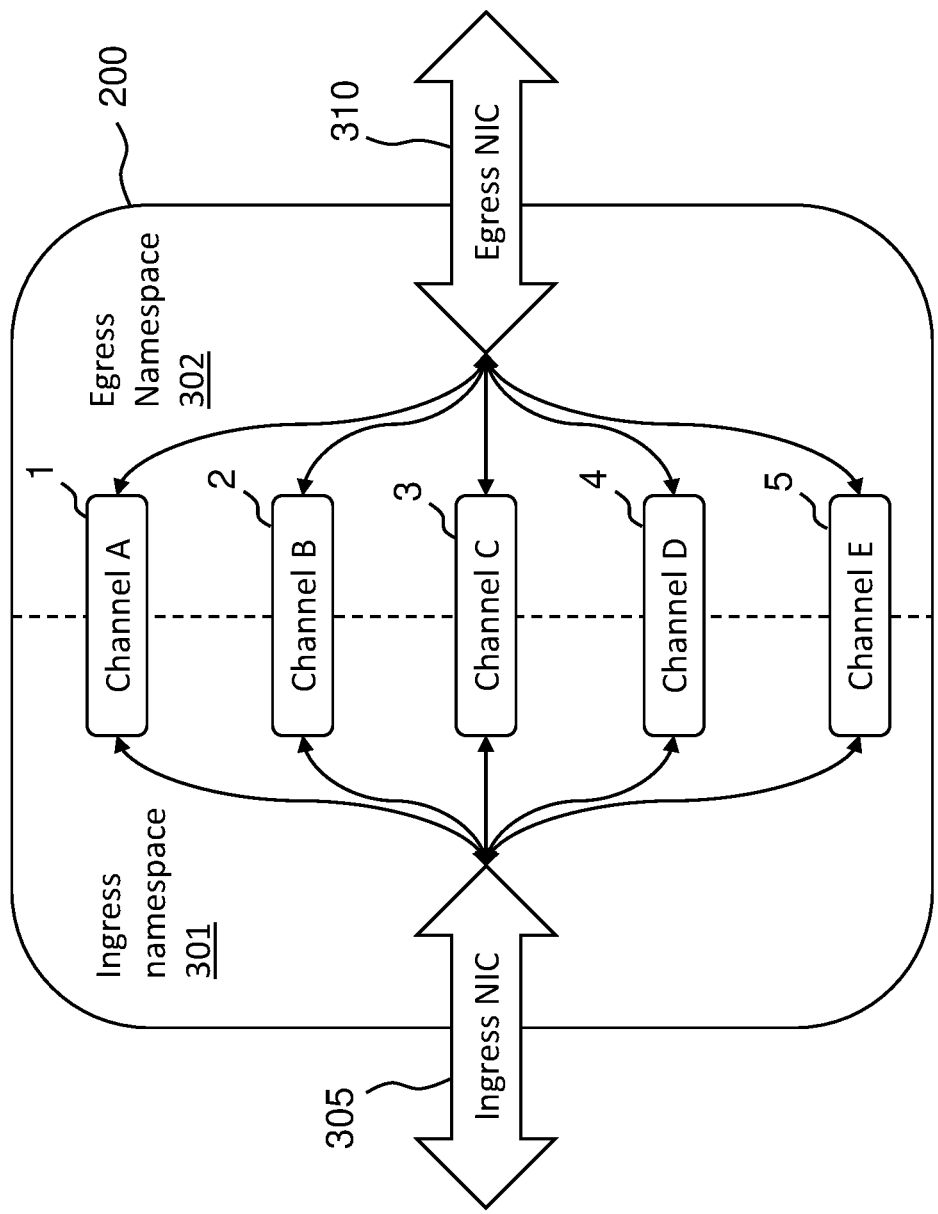
FIG. 3 shows in schematic form an architecture at a specific instance of analysing traffic passing to and from a specific vehicle.

As shown in FIG. 3, which shows in schematic form at least some of the processing that occurs within the classification system 200, the classification system is configured to run two network namespaces: the Ingress Namespace 301 and the Egress Namespace 302. The Ingress NIC 305 is located in the Ingress Namespace 301, and the Egress NIC 310 is located in the Egress Namespace 302. The Ingress network is used to receive request packets and deliver response packets. The Egress network is used to deliver request packets and receive response packets. The routing of these packets is controlled by the Routing Controller 220.

It will be understood by those of ordinary skill that a network namespace is independent implementation of the IP stack. Hosting the Ingress and Egress NICs in distinct namespaces effectively isolates the traffic on each network. Transferring packets between networks requires that they be transferred between namespaces. In order to achieve this transfer between the respective namespaces, the system of the present teaching employs a known Linux configuration, that of virtual Ethernet (VETH), which enables the creation of a local ethernet tunnel between respective namespaces. A veth pair is a virtual ethernet connection with two endpoints; packets written to one endpoint can be read from the other, and vice versa. Within the host system of FIG. 3, the present teaching uses veth pairs 1-5 to bridge the network namespaces by locating one end of each respective pair in the Ingress Namespace 301 and the other end in the Egress Namespace 302.

As part of the initial configuration of the system to prepare for classification of traffic, the present teaching initially creates a veth pair between the ingress and egress namespaces for each service that is being classified, and one additional veth pair for unclassified traffic. These veth pairs effectively act as channels through which the classified traffic flows. In this example, the services being classified are those identified with channels A through D whereas the final channel, channel E is that channel through which all non-classified traffic will be routed. It will be appreciated that the number of channels shown is purely for illustrative purposes, and again purely for ease of understanding it can be considered that channel A could be used for a first music streaming service, channel B for a video streaming service, channel C for a second music streaming service, channel D for navigation services such as those provided by Google maps, and channel E for all other internet traffic-browsing, other data service providers and the like. It will be appreciated that this number of channels or association with specific services can be varied dependent on specific requirements of the system.

It will be understood that any packet traversing a packet-based network comprises a header and a payload. The header includes the control information which provides data for delivering the payload (e.g., source and destination network addresses) and the payload includes the user data.

The present system classifies traffic by inspecting the destination address for vehicle originating packets and the source address for vehicle terminating packets. By defining, within a routing table, entries associating specific addresses with specific channels, it is then possible on identifying a specific address within the header information, to use the entries in the routing table to direct packets to their appropriate veth pair. Thus the act of routing traffic through a specific channel implicitly classifies the traffic as being associated with a particular type of data service.

Figure 4:
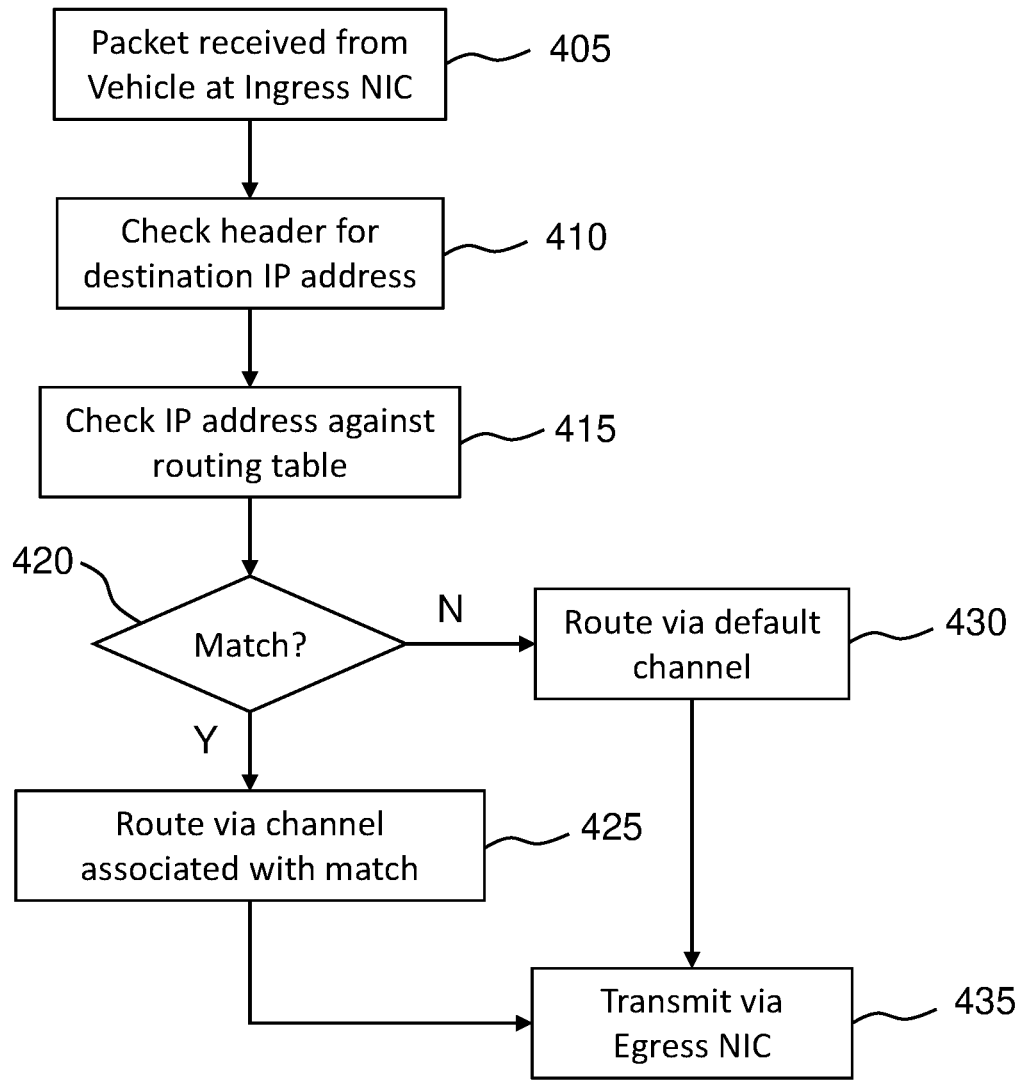
FIG. 4 is a process flow showing how data originating from the vehicle can be routed.

FIG. 4 shows a process flow associated with routing vehicle originating traffic. Packets arrive from a vehicle at the Ingress NIC (step 405). It will be understood that conventionally the actual vehicle identifier, VIN, or mobile identifier for the vehicle, the IMSI, will not be visible at the Ingress NIC 301. Per conventional traffic sessions, traffic originating from the vehicle is initially routed to a packet gateway (PGW) which will be appreciated is a conventional component of the cellular network 110. The PGW allocates an IP Address to the vehicle for the duration of the session. The PGW also publishes a data feed that correlates a MSISDN identifier to the IP address that was allocated for the session. Per the present teaching this feed can be used to subsequently reconcile traffic routed through the Ingress and Egress NIC to attribute service traffic to specific vehicles as the MSISDN can be resolved to the VIN/IMSI out of band during an analytics phase. For example, a proportion of traffic routed through the system 200 can be attributed to an individual vehicle 105a, while other proportions of the traffic can be attributed to vehicles 105b and 105c. Typically, this reconciliation will be effected through an offline processing of the PGW feed and the channel volume data from the EDR generator 225 by the analytics engine 250. Accordingly, analytics engine 250 can analyse traffic on a per-channel and per-vehicle basis. It will be appreciated that there is an association between the destination IP address of the response packet and the MSISDN of the respective vehicle, but this is typically only known at the Packet Gateway (PGW). This IP Address can be associated with specific vehicles but this is typically not done as the PGW itself. That notwithstanding, once packets are received from vehicles at the Ingress NIC 301, the headers are checked for the destination IP address (step 410). That IP address is extracted and then checked against the routing table (step 415). If there is a match (step 420) they are routed to the appropriate channel, which is provided by the defined veth pair, according to the destination IP address (step 425).

If there is no match (step 420) arising from the fact that there is no defined explicit route in the routing table defined for the destination IP address, the packets are routed to the default channel (step 430) which is associated with its own specific veth pair. In the example of FIG. 3, this default channel is channel 5 and is associated with all internet traffic that is not elsewhere classified.

In either scenario (match or no match) the packets exit the veth pair in the Egress Namespace and are routed onward via the upstream gateway associated with the service, or via the default gateway if no explicit gateway is configured. The packets are then written to the egress NIC from which they are transmitted (step 435)

Figure 5:
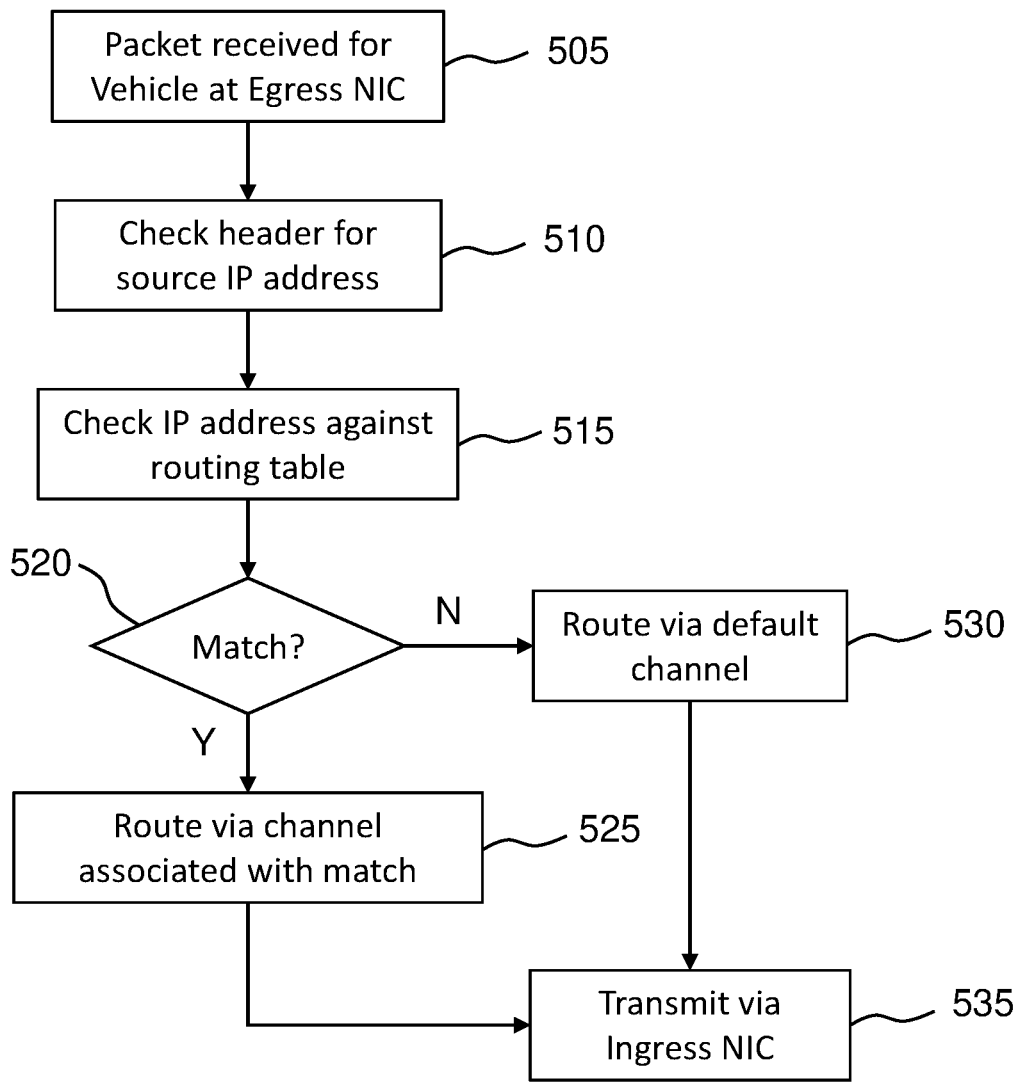
FIG. 5 is a process flow showing how data destined for the vehicle can be routed.

FIG. 5 shows the equivalent process for vehicle terminating traffic. Packets arrive on the Egress NIC (step 505) and are policy routed to the appropriate veth pair according to the source IP address, i.e. from whence they have originated. This is achieved by checking the header for the source IP address (step 510), and checking the routing table for that identified source address (step 515). If no explicit policy route exists (no match in the match determination step 520), the packets are routed via the default veth pair (step 530). If an explicit policy route exists (match in the match determination step 520), the packets are routed to the channel associated with the match (step 525). In either scenario, the packets exit the veth pair in the Ingress Namespace and are routed onward via the downstream gateway associated with the destination address. They are transmitted via the Ingress NIC.

By classifying traffic according to IP address, it is possible to aggregate data over time regarding the volume of traffic that passes through any one of the channels.

Figure 6:
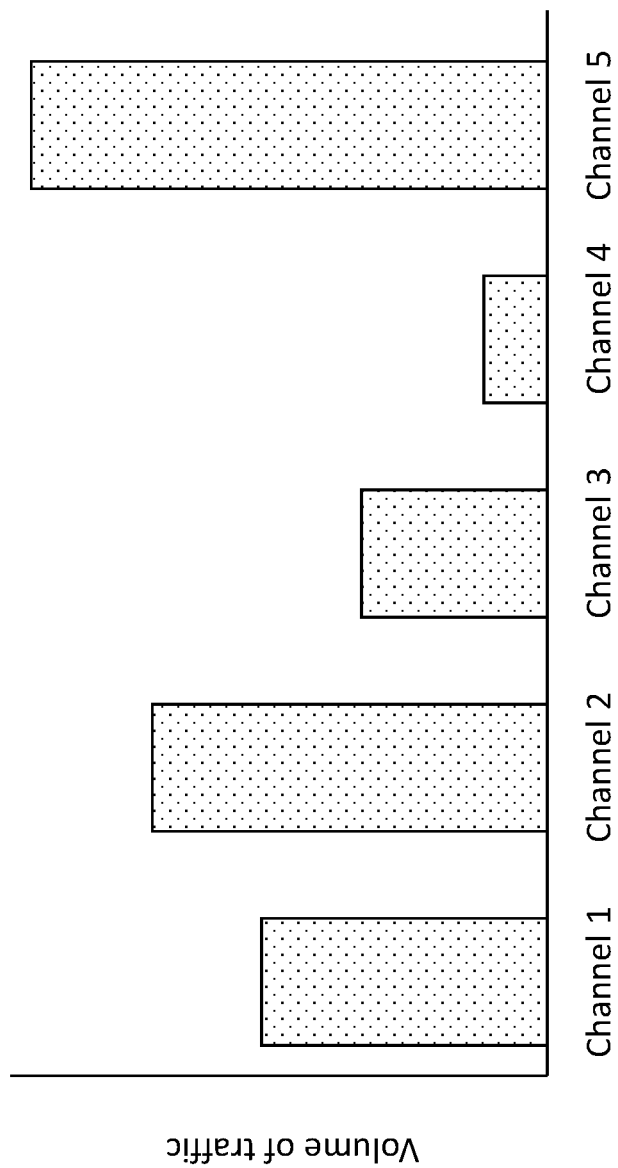
FIG. 6 is an example of a histogram showing an overview of the data services per channel that can be generated using the system of the present teaching.

FIG. 6 shows an example of a histogram of traffic over time that could be computed. It will be appreciated that this is purely illustrative but shows that one can extract meaningful data regarding the nature of the data traffic that is utilised by a vehicle, or group of vehicles, over time. The data is aggregated by calculating the traffic per service by inspecting the headers of packets as they pass across each of the veth pairs. The data of FIG. 6 could be per-channel data associated with a one particular IP address corresponding to a particular vehicle 105, or could be aggregated per-channel data associated with all traffic through the system 200 (i.e. traffic from a plurality of vehicles 105a-c).

For vehicle originating packets, the system can record the number of bytes in the packet and associates them with the source IP address found in the packet headers; for vehicle terminating packets the system can be configured to record the number of bytes from the headers and then associate them with the destination IP address found in the packet headers. As outlined above, the source/destination IP addresses can be correlated with particular vehicles via comparison with the data feed published by the PGW. In this way the system can maintain a count of the bytes uploaded and downloaded for each service on each vehicle. These statistics are collected at regular intervals and sent onward for data processing and analysis, at which point the counts are reset or archived for subsequent usage.

Classification data collected by the system 200 is output as an aggregated dataset and is sent to the database 240 and/or analytics engine 250 for storage and/or further processing.

In an example an aggregated dataset comprising per-channel traffic data is sent from the system 200 to the database 240 for storage. The analytics engine 250 retrieves and processes the aggregated dataset from the database 240. The analytics engine 250 enriches the aggregated dataset with platform data in order to associate traffic on a particular channel with a particular IMSI, vehicle and/or group of vehicles. For example, usage of a particular service provider (e.g. Netflix, Spotify etc) by all vehicles of a particular brand (e.g. VW, Porsche etc) can be inferred from the enriched aggregated dataset and this can used to provide billing and/or reporting data.

Analytics engine 250 takes the per channel/per IP address traffic data output from the system 200 and stored in database 240, and reconciles them to produce equivalent per service/per vehicle traffic summaries. Data consumed (upload and download) is collected at the sampled frequency and stored against the service (user subscribed service) that consumes the data.

In order to create the necessary routing table, to allow meaningful classification of packets that are traversing the system, the system requires knowledge of the IP addresses that are being used by specific data service providers. It will be appreciated that it is known for popular data service providers such as Spotify, Netflix or the like to employ a list of known permanent IP addresses or subnets for their respective services. These are used to create the initial routing configuration that classifies traffic for that service.

However, in an enhancement to this static configuration, the present system is also configured to dynamically discover new IP addresses for a service by inspecting DNS and TLS packets.

In this context it will be appreciated that per conventional internet traffic routing, a DNS lookup is triggered when an application on the client device wants to connect to an Internet host, but only has a name for that host (e.g. services.cubictelecom.com). To open a connection, the application executing on a device (or network node) needs an address. The role of DNS is to lookup the name and return one or more IP addresses that can be used to contact the associated host. Per the present teaching, the routing tables that are used to direct specific traffic through specific channels so as to facilitate a subsequent analysis of what specific internet services are used by particular vehicles are populated with specific IP addresses per specific known services. In this way, the routing table will use known IP addresses for known services to route the traffic for those services through the channel associated with those IP addresses.

Certain services have static IP addresses that are associated with those services, and for those services which the system of the present invention may anticipate traffic analysis being required, the routing tables for the channels associated with those services can be pre-configured with those IP addresses. It will be understood that a plurality of IP addresses may also be associated with one service provider, and the routing tables of the present invention can accommodate using a plurality of IP addresses for routing traffic for one dedicated service.

For other services, or even for example where a specific service geofences traffic to specific IP addresses, the actual IP address that is used to serve the application request may differ over time. The system of the present teaching can address these type of dynamic IP addresses by analysing incoming traffic to identify changes in the IP addresses associated with a service, and then updating the routing table when a new IP address for that target service is found. In such an arrangement of dynamically updating the routing table used in classification of subsequent packets, the system can be configured to perform DNS packet (UDP port 53) inspection by first matching the domain in a DNS query against a collection of regular expressions. As part of a configuration of the system, each service for which an analytical channel is required can have a defined set of regular expressions to match against. If a match is found, the system can cache the request ID and waits for the corresponding DNS response. When the response arrives, the IP addresses associated with the domain are forwarded to the Routing Controller, which updates the routing table entries for the service. Subsequent traffic to and from those IP addresses will now be classified as belonging to that service.

In certain cases, the domain being queried may be too general to associate with the service. In this case, the DNS rule can include additional rules for matching the CNAME of the DNS response. The IP addresses returned in the response are then forwarded to the Routing Controller if and only if the response includes a CNAME, and the CNAME matches one of the rules provided.

Figure 7:
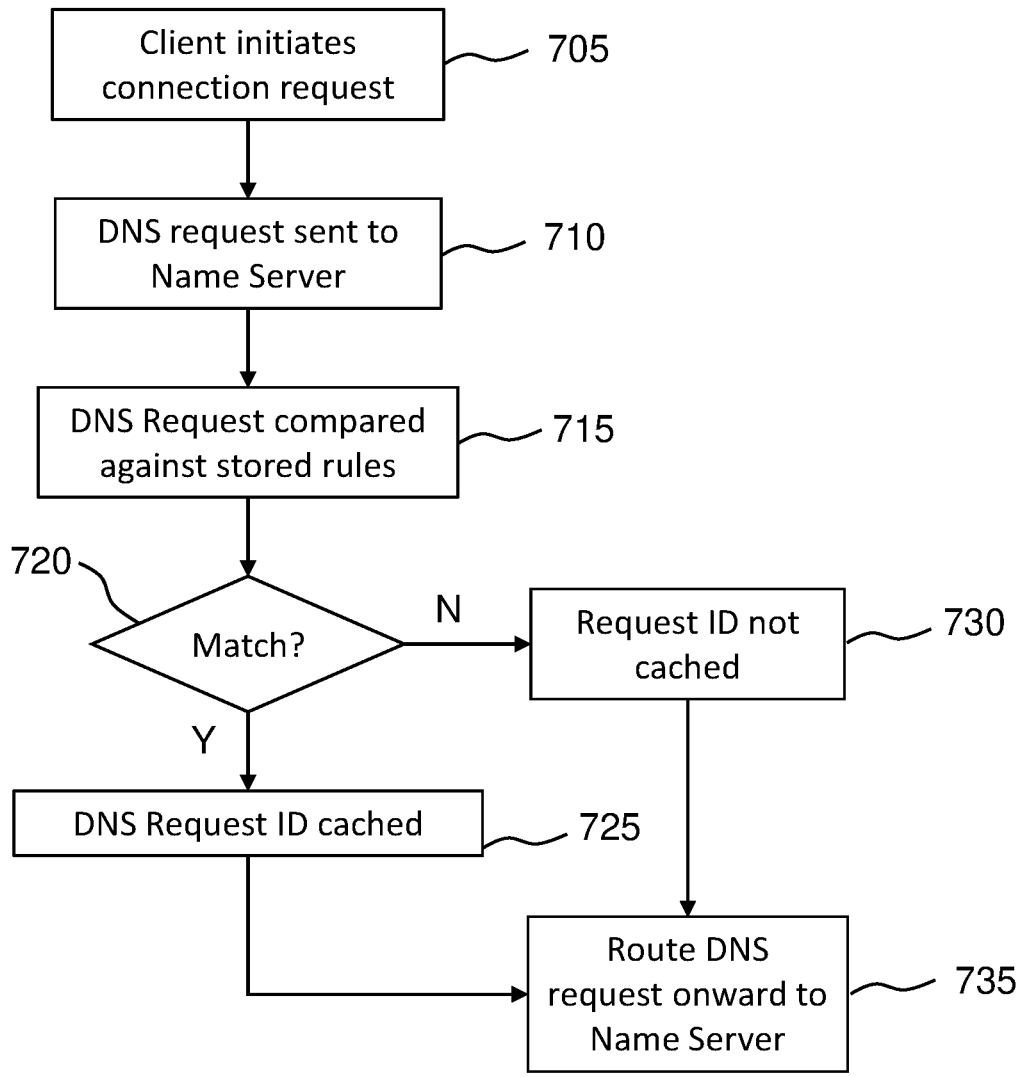
FIG. 7 is an example of a portion of a DNS lookup process flow that can be employed per the present teaching.
Figure 8:
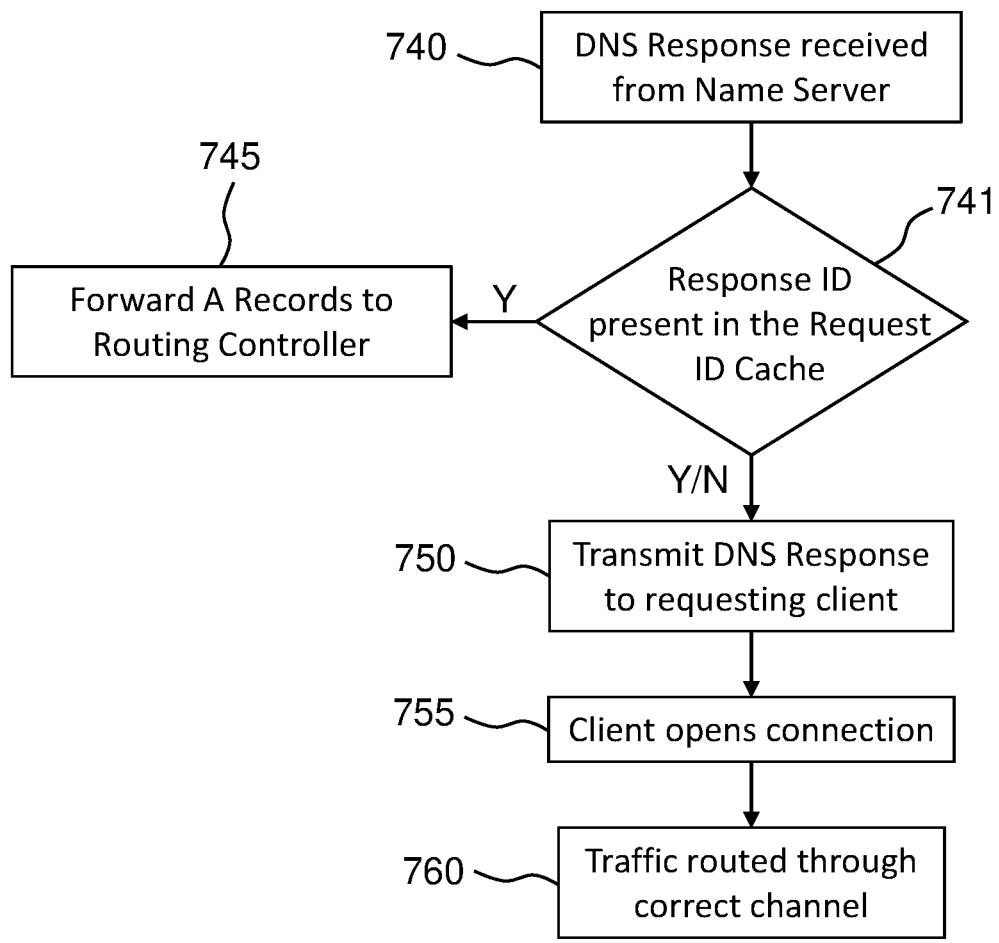
FIG. 8 is an example of another portion of a DNS lookup process flow that can be employed per the present teaching.

FIGS. 7 and 8 are schematics showing an exemplary process flow associated with how a system per the present teaching can resolve traffic being routed through the system to ensure that the appropriate channels are used.

The process commences when a client device, the vehicle, attempts to open a connection to a host Step 705. The client device sends a DNS request to a Name Server to resolve the host name to one or more IP addresses, Step 710. The DNS request is identified when it arrives at the Ingress NIC. On arrival, the request is inspected and the host is compared against the rules that have been defined for each service, Step 715. If there is no match, the Request ID is not stored (Step 730) but the request is still routed onwards to the DNS Name Server, Step 735.

If there is a match, Step 720, for the host, the DNS request ID is cached and the DNS request passes through the Egress NIC and routed to a DNS Name Server, which resolves the request, and replies with a DNS response.

When a DNS response is received from the Name Server, Step 740 the response ID of the DNS response is checked against the Request ID cache to see of there is a match, Step 741.

If a match is found, Step 745, the system is configured to forward A Records to Routing Controller, the person of skill will appreciate that the A records are the portion of the DNS response that contain the IP address associated with the domain. The Routing Controller then will update the routing tables for the associated Service.

Whether or not a match is found, the DNS response is transmitted onward to the requesting client, Step 750.

The client opens a connection to one of the IP addresses contained in the DNS response, Step 755.

The traffic resultant from the request is routed through the correct channel as defined by the Routing Controller, Step 760

Figure 9:
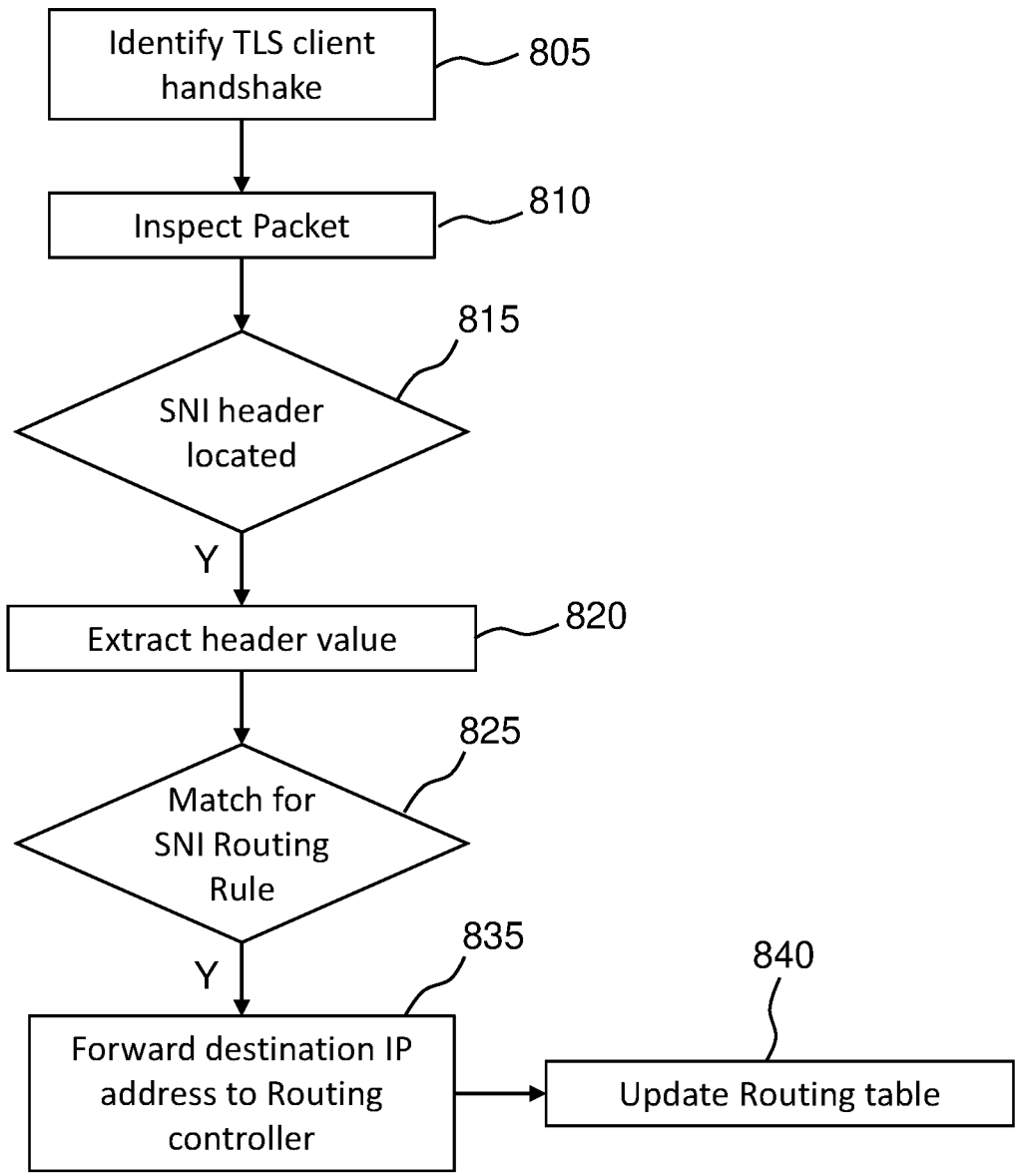
FIG. 9 is an example of TLS packet inspection process flow that can be employed in accordance with the present teaching.

Per the process flow of FIG. 9, the system can also be configured to monitor all upstream TLS packets (TCP port 443) on the Ingress NIC. When it identifies a TLS handshake in process Step 805, it inspects the ClientHandshake packet to determine whether or not it contains an SNI (Server Name Indication) extension header Step 810. If an SNI header is located, the value of the header is extracted, Step 820, and compared against the SNI matching rules defined for each service. If a service rule matches, Step 825, the destination IP address of the packet is assumed to be a distinguishing IP address for that service, and the destination IP address is forwarded, Step 835, to the Routing Controller. As in the case of DNS matches, the Routing Controller updates the routing table entries for the service 840.

It will be understood from the above that a system per the present teaching enables a classification of data usage at a network level based on the services that are generating that traffic. By identifying the IP address of different data service providers, it is then possible, per the present teaching to route network traffic at the network level through channels that are specific to these different data service providers. The routing is effected by parsing the headers of packets traversing the network and then routing the packet to a specific channel based on the source or destination IP address. In this way the nature of the traffic is inferred from the generating data service provider's IP address as opposed to having to do deep packet analysis of the individual packets traversing the network.

The system of the present teaching is configured to route traffic originating from specific vehicles through channels that are specific to different data service providers. In this way a granular overview of the type of data services that are being used by a specific vehicle is effected at a network level. The system requires no interrogation at the actual vehicle of, for example, browsing activity, cookies or the like. The analysis is performed on the basis of the packets traversing the network device. By using the device identifier, typically the IMSI, of the vehicle it is possible to then track the traffic that originates from that vehicle or is routed to that vehicle from different data service providers. That facilitates the monitoring of data usage, but also allows additional functionality such as service blocking, routing configuration changes based on device or data service being used, billing data and the like.

It will be understood that the system of the present teaching provides tracking at a device specific level, not a browser or specific application level. Whilst the data analytics is performed per device, it is possible to track all devices using a network so as to give an overall view of activity of all the specified devices on the networks, as opposed to having to statistical sampling to estimate traffic.

As detailed above, the system of the present teaching tracks requests from a network level and not from an application such as a web browser, so it is possible to see and track all requests for data services from internet type data service providers. These include web based services but also extend to include non human/user facing services such as machine to machine services for items such as telematics, maps, other machine to machine data as well as consumer based services such as website requests OR streaming data services such as Netflix/Spotify.

The data requests are tracked at a raw request level coming through the network. This differs from other traffic analysis tools that either record from requests made from within a web browser which would not see other requests (taking a PC for example) from a terminal window, for updates from the OS etc etc.

It will be understood that exemplary arrangements of a data analytics system that is located within a network node, for example between a vehicle and a data service provider. The system is configured to parse packets of data originating from, or destined to, a specific vehicle and based on the header information in those packets to route the packets through specific channels within the network node so as to enable data analytics to be performed on the nature of the specific data services that are being used by that vehicle. Modifications can be made to that herein described without departing from scope of the present application which is intended to be limited only insofar as is necessary in the light of the claims that follow.

The words comprises/comprising when used in this specification are to specify the presence of stated features, integers, steps or components but does not preclude the presence or addition of one or more other features, integers, steps, components or groups thereof.

The invention claimed is:

1. A method at a network node of classifying in-vehicle data traffic, the method comprising:
   defining at the network node a first network namespace and a second network namespace, the first network namespace comprising an ingress network interface configured to receive incoming request data packets and deliver response data packets, the second network namespace comprising an egress network interface configured to receive incoming response data packets and deliver request data packets, wherein a plurality of channels are provided between the first network namespace and the second network namespace such that traffic between the ingress network interface and the egress network interface is routed through the channels;
   receiving, from a vehicle, a plurality of incoming request data packets at the network node, the data packets originating from an application executing at the vehicle;
   for each data packet of the plurality of incoming request data packets:
      extracting from a header of the data packet a source IP address for the data packet, the source IP address being associated with the vehicle;
      extracting from the header of the data packet, a destination IP address for the data packet, the destination IP address being associated with a service requested by the application;
      determining a volume of data for the incoming data packet by inspecting the header of the data packet;
      checking the destination IP address against a routing table, and;
         on determining that the destination IP address is defined within the routing table, routing the incoming data packet through a channel defined for that destination IP address, wherein the channel is one of the plurality of channels provided between the first network namespace and the second network namespace, or
         on determining that the destination IP address is not defined within the routing table, routing the incoming data packet through a default channel provided for all not-defined destination IP addresses, wherein the default channel is one of the plurality of channels provided between the first network namespace and the second network namespace;
      updating a channel volume indicator based on the determined volume of data for the incoming request data packet;
   transmitting the plurality of incoming request data packets from the network node onward to the destination IP addresses associated with each of the request data packets.

2. The method of claim 1 wherein incoming request data packets are received at least partially over a cellular data network.

3. The method of claim 1, wherein the routing table uses the same channel for identical destination IP address traffic.

4. The method of claim 1 comprising:
   In response to transmitting the plurality of incoming request data packets from the network node onward to the destination IP addresses receiving a plurality of incoming response data packets at the network node,
   For each data packet of the plurality of incoming response data packets: Extracting from a header of the data packet a destination IP address for the data packet, the destination IP address being associated with the vehicle;
   Extracting from the header of the data packet, a source IP address for the data packet, the source IP address being associated with a service requested by the application;
   Determining a volume of data for the incoming data packet by inspecting the header of the data packet;
   Checking the source IP address against the routing table, and;
   On determining that the source IP address is defined within the routing table, routing the incoming data packet through a channel defined for that source IP address, wherein the channel is one of the plurality of channels provided between the first network namespace and the second network namespace, or On determining that the source IP address is not defined within the routing table, routing the incoming data packet through a default channel provided for all not-defined source IP addresses, wherein the default channel is one of the plurality of channels provided between the first network namespace and the second network namespace;

Updating a channel volume indicator based on the determined volume of data for the incoming request data packet;

Transmitting each of the plurality of incoming response data packets from the network node onward to the respective vehicle associated with an IP address for each of the response data packets.

5. The method of claim 4 wherein the transmitting is done at least partially using a cellular data network.

6. The method of claim 4, wherein the routing table uses the same channel for identical source IP address traffic.

7. The method of claim 1 wherein each of a plurality of the channels are associated with distinct applications executing at the vehicle.

8. The method of claim 1 comprising defining the channels within the routing table, the method comprising associating known IP address values with specific channels, such that traffic destined for an IP address which is associated with a specific channel is routed through that channel.

9. The method of claim 1 further comprising dynamically updating the routing table, the method comprising for an incoming DNS request data packet performing a packet inspection by first matching the domain in the DNS query against a collection of defined expressions, each defined expression being associated with a specific service and if a match is found, the method comprises on receiving a response data packet to the request data packet, updating the routing table with the IP address or addresses for the domain such that subsequent traffic to and from those IP addresses will route through the channel associated with the specific service which originally matched against the DNS request data packet.

10. The method of claim 1 further comprising dynamically updating the routing table, the method comprising:
   monitoring upstream TLS packets to identify a TLS handshake,
   on determining a TLS handshake is in process inspecting the packet to determine whether it contains an SNI header,
   on locating an SNI header, extracting a value of the header and comparing that value against SNI matching rules defined for each service,
   if an SNI rule matches, updating the routing table for the service owning the rule with the destination IP Address header of the TLS packet.

11. A network node comprising a processor, a first network interface, and a second network interface, the network node being configured to:
   Define at the network node a first network namespace and a second network namespace, the first network namespace comprising an ingress network interface configured to receive incoming request data packets and deliver response data packets, the second network namespace comprising an egress network interface configured to receive incoming response data packets and deliver request data packets, wherein a plurality of channels are provided between the first network namespace and the second network namespace such that traffic between the ingress network interface and the egress network interface is routed through the channels;
   Receive, from a vehicle, a plurality of incoming request data packets at the network node, the data packets originating from an application executing at the vehicle;
   For each data packet of the plurality of incoming request data packets:
   Extract from a header of the data packet a source IP address for the data packet, the source IP address being associated with the vehicle;
   Extract from the header of the data packet, a destination IP address for the data packet, the destination IP address being associated with a service requested by the application;
   Determine a volume of data for the incoming data packet by inspecting the header of the data packet;
   check the destination IP address against a routing table, and;
   On determining that the destination IP address is defined within the routing table, route the incoming data packet through a channel defined for that destination IP address, wherein the channel is one of the plurality of channels provided between the first network namespace and the second network namespace, or On determining that the destination IP address is not defined within the routing table, route the incoming data packet through a default channel provided for all not-defined destination IP addresses, wherein the default channel is one of the plurality of channels provided between the first network namespace and the second network namespace;
   Update a channel volume indicator based on the determined volume of data for the incoming request data packet;
   Transmit the plurality of incoming request data packets from the network node onward to the destination IP addresses associated with each of the request data packets.

12. The network node of claim 11 wherein incoming request data packets are received at least partially over a cellular data network.

13. The network node of claim 11, wherein the routing table uses the same channel for identical destination IP address traffic.

14. The network node of claim 11, wherein the network node is further configured to:
   In response to transmitting the plurality of incoming request data packets from the network node onward to the destination IP addresses, receive a plurality of incoming response data packets at the network node, For each data packet of the plurality of incoming response data packets: Extract from a header of the data packet a destination IP address for the data packet, the destination IP address being associated with the vehicle; Extract from the header of the data packet, a source IP address for the data packet, the source IP address being associated with a service requested by the application;
   Determine a volume of data for the incoming data packet by inspecting the header of the data packet;
   Check the source IP address against the routing table, and;
   On determining that the source IP address is defined within the routing table, route the incoming data packet through a channel defined for that source IP address, wherein the channel is one of the plurality of channels provided between the first network namespace and the second network namespace, or On determining that the source IP address is not defined within the routing table, route the incoming data packet through a default channel provided for all not-defined source IP addresses, wherein the default channel is one of the plurality of channels provided between the first network namespace and the second network namespace;

Update a channel volume indicator based on the determined volume of data for the incoming request data packet;

Transmit each of the plurality of incoming response data packets from the network node onward to the respective vehicle associated with an IP address for each of the response data packets.

15. The network node of claim 14 wherein the transmitting is done at least partially using a cellular data network.

16. The network node of claim 14, wherein the routing table uses the same channel for identical source IP address traffic.

17. The network node of claim 11 wherein each of a plurality of the channels are associated with distinct applications executing at the vehicle.

18. The network node of claim 11 wherein the network node is further configured to define the channels within the routing table, and to associate known IP address values with specific channels, such that traffic destined for an IP address which is associated with a specific channel is routed through that channel.

19. The network node of claim 11 wherein the network node is further configured to dynamically update the routing table, and for an incoming DNS request data packet perform a packet inspection by first matching the domain in the DNS query against a collection of defined expressions, each defined expression being associated with a specific service and if a match is found, the network node is further configured to, on receiving a response data packet to the request data packet, update the routing table with the IP address or addresses for the domain such that subsequent traffic to and from those IP addresses will route through the channel associated with the specific service which originally matched against the DNS request data packet.

20. The network node of claim 11 wherein the network node is further configured to dynamically update the routing table and to:

monitor upstream TLS packets to identify a TLS handshake, on determining a TLS handshake is in process, inspect the packet to determine whether it contains an SNI header, on locating an SNI header, extract a value of the header and comparing that value against SNI matching rules defined for each service, if an SNI rule matches, update the routing table for the service owning the rule with the destination IP Address header of the TLS packet.

* * * * *

UNITED STATES PATENT AND TRADEMARK OFFICE
CERTIFICATE OF CORRECTION

PATENT NO.        : 12,368,667 B2
APPLICATION NO.   : 18/292134
DATED             : July 22, 2025
INVENTOR(S)       : Frank Monahan et al.

It is certified that error appears in the above-identified patent and that said Letters Patent is hereby corrected as shown below:

In the Claims

Claim 1, Column 12, Line 17, "table, and;" should read as —table; and—.

Claim 4, Column 12, Line 46, "In" should read as —in—.

Claim 4, Column 12, Line 50, "For" should read as —for—.

Claim 4, Column 12, Line 51, "Extracting" should read as —extracting—.

Claim 4, Column 12, Line 55, "Extracting" should read as —extracting—.

Claim 4, Column 12, Line 58, "Determining" should read as —determining—.

Claim 4, Column 12, Line 60, "Checking" should read as —checking—.

Claim 4, Column 12, Line 61, "table, and;" should read as —table; and—.

Claim 4, Column 12, Line 62, "On" should read as —on—.

Claim 4, Column 13, Line 1, "On" should read as —on—.

Claim 4, Column 13, Line 8, "Updating" should read as —updating—.

Claim 4, Column 13, Line 11, "Transmitting" should read as —transmitting—.

Claim 11, Column 13, Line 58, "Define" should read as —define—.

Signed and Sealed this
Sixteenth Day of September, 2025

Coke Morgan Stewart
*Acting Director of the United States Patent and Trademark Office*

CERTIFICATE OF CORRECTION (continued)
U.S. Pat. No. 12,368,667 B2

Claim 11, Column 14, Line 4, "Receive," should read as —receive,—.

Claim 11, Column 14, Line 8, "For" should read as —for—.

Claim 11, Column 14, Line 10, "Extract" should read as —extract—.

Claim 11, Column 14, Line 13, "Extract" should read as —extract—.

Claim 11, Column 14, Line 17, "Determine" should read as —determine—.

Claim 11, Column 14, Lines 19-20, "table, and;" should read as —table; and—.

Claim 11, Column 14, Line 21, "On" should read as —on—.

Claim 11, Column 14, Line 26, "On" should read as —on—.

Claim 11, Column 14, Line 34, "Update" should read as —update—.

Claim 11, Column 14, Line 37, "Transmit" should read as —transmit—.

Claim 14, Column 14, Line 49, "In" should read as —in—.

Claim 14, Column 14, Line 53, "For" should read as —for—.

Claim 14, Column 14, Line 54, "Extract" should read as —extract—.

Claim 14, Column 14, Line 61, "Determine" should read as —determine—.

Claim 14, Column 14, Line 63, "Check" should read as —check—.

Claim 14, Column 14, Line 63, "table, and;" should read as —table; and—.

Claim 14, Column 14, Line 64, "On" should read as —on—.

Claim 14, Column 15, Line 3, "On" should read as —on—.

Claim 14, Column 15, Line 10, "Update" should read as —update—.

Claim 14, Column 15, Line 13, "Transmit" should read as —transmit—.